United States Patent
Backman et al.

(10) Patent No.: US 12,143,464 B2
(45) Date of Patent: Nov. 12, 2024

(54) COMMUNICATION OF NON-IP DATA OVER PACKET DATA NETWORKS

(71) Applicant: Telefonaktiebolaget LM Ericsson (publ), Stockholm (SE)

(72) Inventors: Jan Backman, Kärna (SE); Lasse Olsson, Träslövsläge (SE); Hans Bertil Rönneke, Kungsbacka (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/748,360

(22) PCT Filed: Aug. 21, 2015

(86) PCT No.: PCT/EP2015/069273
§ 371 (c)(1),
(2) Date: Jan. 29, 2018

(87) PCT Pub. No.: WO2017/032399
PCT Pub. Date: Mar. 2, 2017

(65) Prior Publication Data
US 2018/0219981 A1    Aug. 2, 2018

(51) Int. Cl.
*H04L 69/22*    (2022.01)
*H04L 12/54*    (2022.01)
(Continued)

(52) U.S. Cl.
CPC .............. *H04L 69/22* (2013.01); *H04L 12/56* (2013.01); *H04L 65/102* (2013.01);
(Continued)

(58) Field of Classification Search
CPC ....... H04L 69/22; H04L 69/00; H04L 69/167; H04L 69/16; H04L 69/321; H04L 69/32;
(Continued)

(56) References Cited

U.S. PATENT DOCUMENTS

2001/0022785 A1* 9/2001 Pessi ..................... H04L 69/329
                                                                    370/352
2004/0148425 A1* 7/2004 Haumont .............. H04L 65/104
                                                                    709/236
(Continued)

FOREIGN PATENT DOCUMENTS

| CN | 102577502 A | 7/2012 |
| CN | 103814564 A | 5/2014 |
| EP | 1 641 193 A1 | 3/2006 |

OTHER PUBLICATIONS

International Search Report and Written Opinion of the International Searching Authority for PCT International Application No. PCT/EP2015/069273, 10 pages (May 13, 2016).
(Continued)

*Primary Examiner* — Jeffrey M Rutkowski
*Assistant Examiner* — Luna Weissberger
(74) *Attorney, Agent, or Firm* — Sage Patent Group

(57) ABSTRACT

There is provided mechanisms for communicating non-IP data over a PDN of PDN type IPv4, IPv6, or IPv4IPv6. A method is performed by a core network gateway node. The method comprises communicating IP packets over a packet data network of PDN type IPv4, IPv6, or IPv4IPv6 with an application server, the IP packets comprising an IP header and being addressed to a wireless device. The method comprises communicating header-less payload packets over the packet data network with the wireless device. The header-less payload packets correspond to the IP packets having the IP header removed and represent the non-IP data.

20 Claims, 5 Drawing Sheets

(51) Int. Cl.
*H04L 65/102* (2022.01)
*H04L 69/16* (2022.01)
*H04L 69/166* (2022.01)
*H04L 69/167* (2022.01)
*H04L 69/321* (2022.01)
*H04W 28/06* (2009.01)

(52) U.S. Cl.
CPC .......... *H04L 69/161* (2013.01); *H04L 69/166* (2013.01); *H04L 69/167* (2013.01); *H04L 69/321* (2013.01); *H04W 28/06* (2013.01)

(58) Field of Classification Search
CPC ..... H04L 69/30; H04L 69/166; H04L 69/161; H04L 65/102; H04L 65/1013; H04L 65/10; H04L 12/56; H04L 12/54; H04L 12/00; H04W 28/06; H04W 28/02; H04W 28/00
USPC ......................................................... 370/352
See application file for complete search history.

(56) References Cited

U.S. PATENT DOCUMENTS

| | | | | |
|---|---|---|---|---|
| 2009/0059940 A1* | 3/2009 | Sultan | ............... | H04L 29/12009 370/401 |
| 2009/0158418 A1* | 6/2009 | Rao | ..................... | H04L 63/0236 726/12 |
| 2010/0189103 A1* | 7/2010 | Bachmann | ............ | H04W 28/06 370/389 |
| 2010/0208634 A1* | 8/2010 | Eng | ........................ | H04L 43/087 370/352 |
| 2011/0149848 A1* | 6/2011 | Ho | .......................... | H04L 69/04 370/328 |
| 2012/0170512 A1* | 7/2012 | Gleixner | ............... | H04L 65/103 370/328 |
| 2012/0182934 A1* | 7/2012 | Diachina | ............... | H04W 28/06 370/328 |
| 2012/0254362 A1* | 10/2012 | Li | ........................ | H04W 4/025 709/218 |
| 2012/0282956 A1* | 11/2012 | Kim | ........................ | H04W 4/70 455/466 |
| 2014/0064241 A1* | 3/2014 | Takaoka | ................ | H04L 5/0041 370/330 |
| 2014/0105062 A1* | 4/2014 | Mcdysan | .............. | H04L 45/306 370/254 |
| 2014/0185438 A1 | 7/2014 | Patel et al. | | |
| 2015/0229713 A1* | 8/2015 | Lu | ........................... | H04W 4/60 709/203 |
| 2017/0006140 A1* | 1/2017 | Park | ..................... | H04L 45/745 |

OTHER PUBLICATIONS

Chinese Search Report with English Translation for Chinese Application No. 201580082495 dated Aug. 21, 2020, 4 Pages.
Chinese First Office Action for Chinese Application No. 201580082495 dated Aug. 31, 2020, 8 Pages. Chinese Language Document.

* cited by examiner (a)

(b)

COMMUNICATION OF NON-IP DATA OVER PACKET DATA NETWORKS

CROSS REFERENCE TO RELATED APPLICATION

This application is a 35 U.S.C. § 371 national stage application of PCT International Application No. PCT/EP2015/069273 filed on Aug. 21, 2015, the disclosure and content of which is incorporated by reference herein in its entirety.

TECHNICAL FIELD

Embodiments presented herein relate to communicating non-Internet Protocol (IP) data over a packet data network (PDN), and particularly to methods, a core network gateway node, a wireless device, computer programs, and a computer program product for communicating non-IP data over a packet data network of PDN type IPv4, IPv6, or IPv4IPv6.

BACKGROUND

In communications networks, there may be a challenge to obtain good performance and capacity for a given communications protocol, its parameters and the physical environment in which the communications network is deployed.

The core network (CN) architecture of the third generation partnership program's (3GPP) Long Term evolution (LTE) wireless communication standard is denoted the System Architecture Evolution (SAE). One component of the SAE architecture is the Evolved Packet Core (EPC), also known as SAE Core. In general terms, the EPC will serve as the equivalent of a General Packet Radio Service (GPRS) network (via a Mobility Management Entity (MME), Serving Gateway (S-GW) and packet data network (PDN) Gateway (P-GW) subcomponents).

For example, existing packets in the EPC to/from the Internet has an Internet protocol (IP) header (v4 or v6) and typically also a Transmission Control Protocol (TCP) or a User Datagram Protocol (UDP) header. Mechanisms exist for header compression in messages exchanged between a wireless device and a radio access network (RAN) node (RANN), such as an eNodeB, serving the wireless device. When header compression is used, the wireless device compresses the TCP/UDP/IP headers in the uplink (i.e., in communication from the wireless device to the RANN) and the RANN decompresses the TCP/UDP/IP headers in the downlink (i.e., in communication from the RANN to the wireless device).

Some issues have been identified for existing mechanisms for machine-to-machine type communication using networks as those disclosed above (especially so called cellular Internet of Things (CIoT) communications).

The wireless device must perform IPv6 address allocation procedures, including repeatedly reallocating the IPv6 address (verifying that it is still in use).

The overhead of the IP headers is reduced by existing header compression schemes, but the overhead may still be regarded as substantial as the IP headers need to be transmitted over the radio interface to set up the compression scheme. With very small amounts of data to transmit, header compression may still be the dominating information sent.

The wireless device must use IP for communication with an external application server (AS), even if that AS is the only communication peer that the wireless device has. Implementation of IP in the wireless device adds to its cost. Implementing an IP stack and an UDP and/or TCP stack requires memory and processing resources in the wireless device. CIoT devices are typically constrained and ultra low cost and it may be a problem to implement the IP/UDP/TCP stack under such conditions.

It has been proposed to use a new PDN type called "non-IP" to avoid some of the above issues. However, introducing a new PDN Type in 3GPP systems may have major impact on both the standard as such and devices implementing the standard. Another issue would be how to tunnel non-IP data to/from the application server.

Hence, there is still a need for an improved communication of non-IP data over a packet data network.

SUMMARY

An object of embodiments herein is to provide efficient communication of non-IP data over a packet data network.

According to a first aspect there is presented a method for communicating non-IP data over a PDN of PDN type IPv4, IPv6, or IPv4IPv6. The method is performed by a core network gateway node. The method comprises communicating IP packets over a packet data network of PDN type IPv4, IPv6, or IPv4IPv6 with an application server, the IP packets comprising an IP header and being addressed to a wireless device. The method comprises communicating header-less payload packets over the packet data network with the wireless device. The header-less payload packets correspond to the IP packets having the IP header removed and represent the non-IP data.

In this respect, the non-IP data may thus be defined as representing data that is transmitted in an IP context but without using IP headers; i.e., where header-less payload packets replace ordinary IP packets.

Advantageously this provides efficient communication of non-IP data over a packet data network.

Advantageously this allows for a minimal impact to existing EPC standards and reuses the PDN Type for "IP", whilst at the same time supports a new type of communication (without using TCP/UDP/IP headers) to address an Application Server from the wireless device.

Advantageously, the handling in Application Servers can be the same for "non-IP and "IP" data (i.e. the AS is not impacted if headers are removed between the wireless device and the core network gateway node (such as a P-GW or C-SGN). That is, existing IP mechanisms can be used in the Application Servers.

Advantageously this allows for a simple communications setup.

Advantageously, by minimizing the overhead transmitted over the air interface to the wireless device, this enables optimized over the air transmission.

Advantageously this allows for parallel communication channels, i.e. communication using with IP headers and without IP headers in parallel.

According to a second aspect there is presented a core network gateway node for communicating non-IP data over a packet data network of PDN type IPv4, IPv6, or IPv4IPv6. The core network gateway node comprises processing circuitry. The processing circuitry is configured to cause the core network gateway node to perform a set of operations. The set of operation causes the core network gateway node to communicate IP packets over a packet data network of PDN type IPv4, IPv6, or IPv4IPv6 with an application server, the IP packets comprising an IP header and being addressed to a wireless device. The set of operation causes the core network gateway node to communicate header-less payload packets over the packet data network with the wireless device. The header-less payload packets correspond to the IP packets having the IP header removed and represent the non-IP data.

According to a third aspect there is presented a computer program for communicating non-IP data over a packet data network of PDN type IPv4, IPv6, or IPv4IPv6, the computer program comprising computer program code which, when run on processing circuitry of a core network gateway node, causes the processing circuitry to perform a method according to the first aspect.

According to a fourth aspect there is presented a method for communicating non-IP data over a packet data network of PDN type IPv4, IPv6, or IPv4IPv6. The method is performed by a wireless device. The method comprises communicating header-less payload packets on a connection over a packet data network of PDN type IPv4, IPv6, or IPv4IPv6 with a core network gateway node. The connection is by the wireless device regarded as a point-to-point connection.

According to a fifth aspect there is presented a wireless device for communicating non-IP data over a packet data network of PDN type IPv4, IPv6, or IPv4IPv6. The wireless device comprises processing circuitry. The processing circuitry is configured to cause the wireless device to perform a set of operations. The set of operations causes the wireless device to communicate header-less payload packets on a connection over a packet data network of PDN type IPv4, IPv6, or IPv4IPv6 with a core network gateway node. The connection is by the wireless device regarded as a point-to-point connection.

According to a sixth aspect there is presented a computer program for communicating non-IP data over a packet data network of PDN type IPv4, IPv6, or IPv4IPv6, the computer program comprising computer program code which, when run on processing circuitry of a wireless device, causes the processing circuitry to perform a method according to the fourth aspect.

According to a seventh aspect there is presented a computer program product comprising a computer program according to at least one of the third aspect and the sixth aspect and a computer readable means on which the computer program is stored.

It is to be noted that any feature of the first, second, third, fourth, fifth, sixth and seventh aspects may be applied to any other aspect, wherever appropriate. Likewise, any advantage of the first aspect may equally apply to the second, third, fourth, fifth, sixth, and/or seventh aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
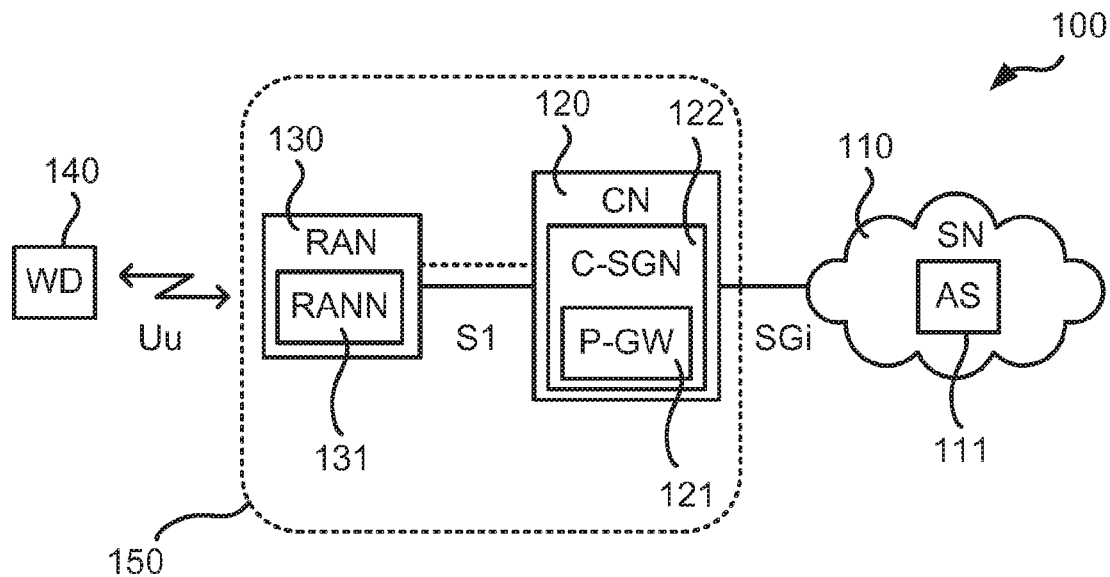
FIG. 1 is a schematic diagram illustrating a communication network according to embodiments.

FIG. 1 is a schematic diagram illustrating a communications network 100 where embodiments presented herein can be applied. The communications network 100 is a packet data network of PDN type IPv4, IPv6, or IPv4IPv6. The communications network 100 comprises an external Service Network (SN) 110. The Service Network 110 in turn comprises at least one Application Server (AS) 111. The Service Network 110 is operatively connected to a cellular network 150 over interface SGi. The cellular network 150 may be an LTE network. The cellular network 150 comprises a Core Network (CN) 120 and a Radio Access Network (RAN) 130. The Core Network 120 comprises a Packet Data Network Gateway (P-GW) 121. The P-GW 121 may be part of a Cellular Internet of Things Serving Gateway Node (C-SGN) 122. The P-GW 121 and the C-SGN 122 are examples of logical entities and are hereinafter denoted core network gateway nodes. The Core Network 120 may comprise further logical nodes, such as a Home Subscriber Server (HSS) 123 (not illustrated in FIG. 1). The Core Network 120 is operatively connected to the RAN 130 over interface S1. The RAN 130 comprises at least one Radio Access Network Node (RANN) 131. The RANN may be provided as radio base station, a base transceiver station, a node B, an evolved node B, or as a remote radio unit. The RANN 131 provides network access to at least one Wireless Device (WD) 140, for example, over interface Uu. The wireless device 140 is thereby enabled to access services and exchange data with the Application Server 111. The wireless device 140 may be a portable wireless device (such as a mobile station, mobile phone, handset, wireless local loop phone, user equipment (UE), smartphone, laptop computer, tablet computer, or IoT device, such as a sensor arrangement configured to access the Application Server in the network 150, etc.).

Figure 9:
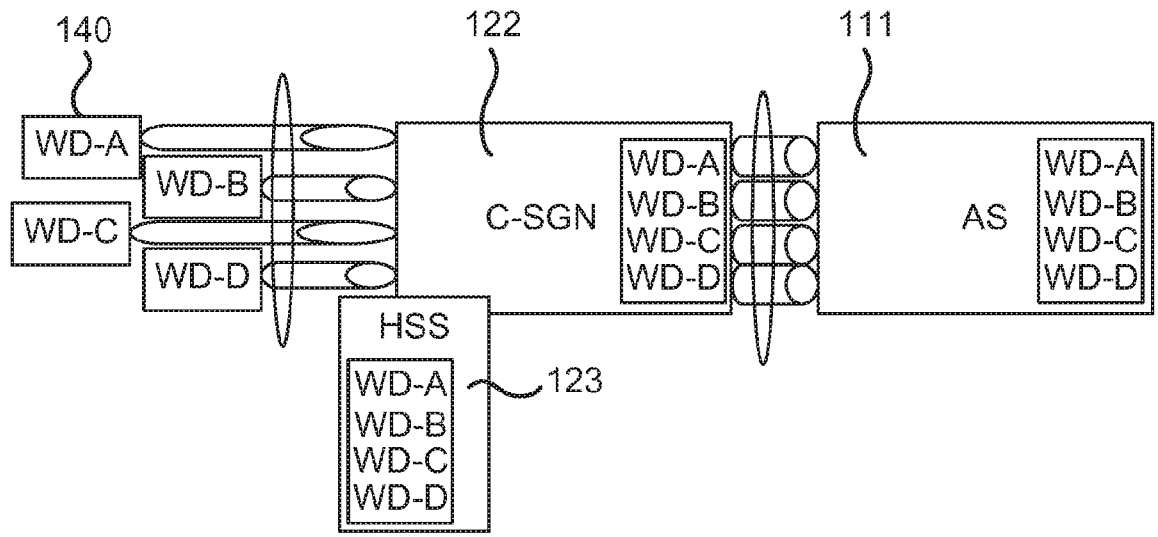
FIG. 9 is a schematic illustration of part of a communication network according to embodiments.
Figure 9:
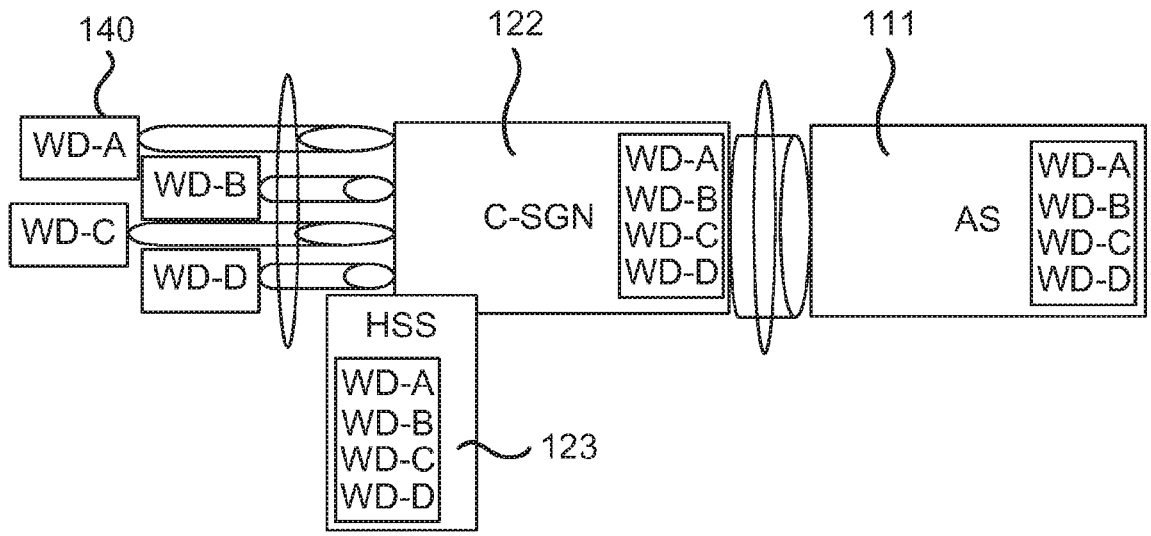

As noted above, a tunnel connection may be established between the wireless device 140 and the Application Server 111. There are many ways for this tunnel connection to be established. Reference is now made to FIGS. 9(*a*) and 9(*b*) relating to two such alternatives. FIGS. 9(*a*) and 9(*b*) schematically illustrate two examples of parts of the communications network 100 of FIG. 1 where there are four wireless devices 140 denoted WD-A, WD-B, WD-C, and WD-D. FIG. 9(*a*) illustrates a scenario where there is one individual tunnel connection per wireless device for the AS 111, and FIG. 9(*b*) illustrates a scenario where there is one common tunnel connection for all the wireless devices for the AS 111.

Some concerns regard how a wireless device 140 is to be identified in the AS 111. Some concerns regard how data is to be switched to the correct PDN connection for forwarding to the wireless device 140 when Down Link (DL) data is received from the AS 111 on the SGi interface in the P-GW 121 or C-SGN 122. Since some identity (ID) of the wireless device 140 needs to be present in the received DL data, some concerns regard how to store the ID in the CN 120 and/or RAN 130. For example, the ID should be present in the P-GW 121 and/or C-SGN 122 as part of a switching table. The ID could, for example, be propagated from subscription information of the wireless device 140 as stored in the HSS 123. The ID could, for example, be signalled using a tunnel establishment protocol on the SGi interface. Some concerns regard security aspects coordinated for the direct tunnel and the PDN connection. Some of these concerns are tied to what protocol is used between the C-SGN 122 and/or P-GW 121 and the AS 111.

Assumptions that have been proposed to resolve these issues will be summarized next. An IPv6 prefix is assigned to the wireless device 140 even if the data is "non-IP". The IP address is not provided to the wireless device 140; the IP address only used on the SGi interface. One tunnel per wireless device 140 is assumed. The wireless device 140 is in the AS 111 identified by the IP address of the wireless device 140. When DL data is received on the SGi interface in the P-GW 121 and/or C-SGN 122 the data is switched to the correct PDN connection for forwarding to the wireless device 140 by mapping the destination IP address to the PDN Connection Tunnel endpoint identifier (TEID). The destination IP address defines the ID of the wireless device 140 in the received DL data. The IP address allocation enables the ID to be present in the P-GW 121 and/or C-SGN 122 as part of the switching table. Further the IP address can be provided (from the P-GW 121 and/or the C-SGN 122) to the AS 111 in the same way for both "non-IP" and "IP" based data (e.g. over the top or using TS 29.061 Radius/Diameter mechanisms, etc.). No specific establishment of the direct tunnel needed in terms of security aspects.

By using the IP address for identifying the wireless device 140 and for tunnelling the non-IP data to the AS 111, the impact on other aspect of the communications network 100, such as other aspects of the cellular network 150, is kept small. For example, the handling in Application Servers 111 can be the same for "non-IP" data and "IP" data.

Assigning and using an IP address to distinguish each wireless device 140 in the AS 111 and on the SGi interface in the P-GW 121 and/or C-SGN 122 implies that the IP address assignment in the cellular network 150 shall be kept. To keep the impact on the communications network 100 small, the "PDN Type" should still be "IP" (i.e., IPv6) for the CIoT PDN connection.

Some changes needed for the PDN connections conveying "Non-IP" data will be summarized next. Firstly, the P-GW 121 shall not provide the allocated IP address to the wireless device 140 i.e. Stateless Address Auto Configuration (SLAAC) or the Dynamic Host Configuration Protocol (DHCP) is not used for "non-IP" PDN connections. Secondly, the IP headers are removed/added before forwarding packets to/from the wireless device 140 respectively. Thirdly, the C-SGN 122 (or a Mobility Management Entity (MME) in the CN 120) should indicate to the RANN 131 not to use header compression for the wireless device 140 (if data radio bearers (DRBs) are used).

By this approach the "non-IP" service provided by the cellular network 150 for CIoT can be seen as a mechanism for header compression or header removal to reduce the amount of overhead data passed over the low bitrate radio interface Uu. The SGi interface towards the AS 111 remains a known IP interface. This enables the use of existing IP mechanisms at the AS side and also minimizes impact on the cellular network 150.

Since a CIoT wireless device 140 using "non-IP" may not have any means to address different ASs 111, the operational connection between the wireless device 140 and the AS 111 may be regarded as a point-to-point tunnel. The IP address of the AS 111 can e.g. be configured commonly for all traffic in an Access Point Name (APN). Communication using UDP/IP may be based on using known UDP ports (e.g. 3GPP defined or deployment unique and management wise coordinated between the AS 111 and C-SGN 122) for "non-IP" data.

The embodiments disclosed herein particularly relate to mechanisms for communicating non-IP data over a PDN of PDN type IPv4, IPv6, or IPv4IPv6. In order to obtain such mechanisms there is provided a core network gateway node 121, 122, a method performed by the core network gateway node 121, 122, a computer program comprising code, for example in the form of a computer program product, that when run on processing circuitry of the core network gateway node 121, 122, causes the core network gateway node 121, 122 to perform the method. In order to obtain such mechanisms there is further provided a wireless device 140, a method performed by the wireless device 140, and a computer program comprising code, for example in the form of a computer program product, that when run on processing circuitry of the wireless device 140, causes the wireless device 140 to perform the method.

Figure 2A:
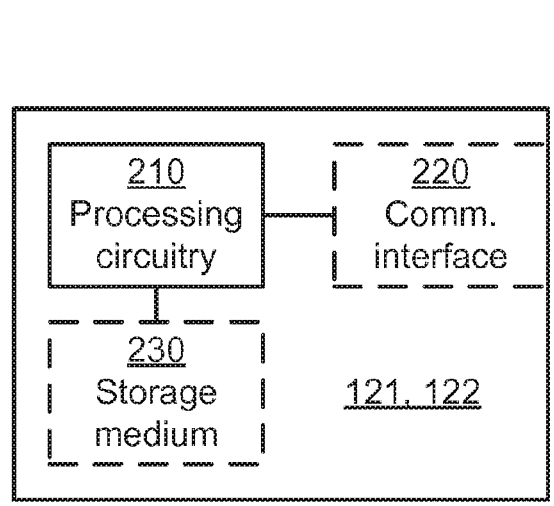
FIG. 2a is a schematic diagram showing functional units of a core network gateway node according to an embodiment.

FIG. 2*a* schematically illustrates, in terms of a number of functional units, the components of a core network gateway node 121, 122 according to an embodiment. Processing circuitry 210 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 410*a* (as in FIG. 4), e.g. in the form of a storage medium 230.

Particularly, the processing circuitry 210 is configured to cause the core network gateway node 121, 122 to perform a set of operations, or steps, S102-S112. These operations, or steps, S102-S112 will be disclosed below. For example, the storage medium 230 may store the set of operations, and the processing circuitry 210 may be configured to retrieve the set of operations from the storage medium 230 to cause the core network gateway node 121, 122 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The core network gateway node 121, 122 may further comprise a communications interface 220 for communications with other entities of the core network 120 as well as entities of the service network 110, such as one or more application servers 111, and entities of the RAN 130, such as one or more RANNs 131, and indirectly with one or more wireless devices 140. As such the communications interface 220 may comprise one or more transmitters and receivers, comprising analogue and digital components and a suitable number of antennas for wireless communications and ports for wireline communications.

The processing circuitry 210 controls the general operation of the core network gateway node 121, 122 e.g. by sending data and control signals to the communications interface 220 and the storage medium 230, by receiving data and reports from the communications interface 220, and by retrieving data and instructions from the storage medium 230. Other components, as well as the related functionality, of the core network gateway node 121, 122 are omitted in order not to obscure the concepts presented herein.

Figure 2B:
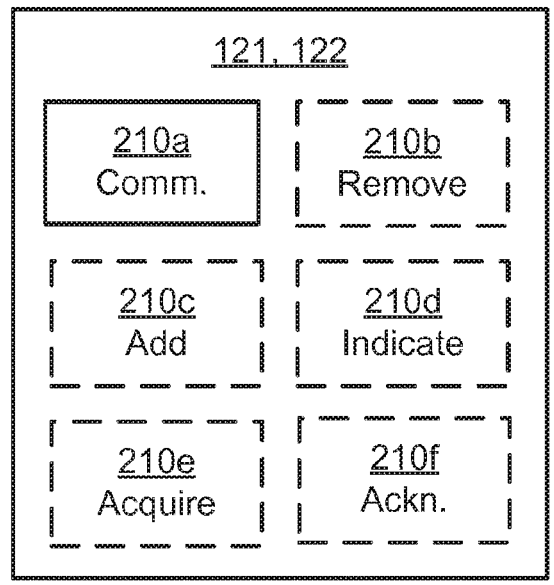
FIG. 2b is a schematic diagram showing functional modules of a core network gateway node according to an embodiment.

FIG. 2b schematically illustrates, in terms of a number of functional modules, the components of a core network gateway node 121, 122 according to an embodiment. The core network gateway node 121, 122 of FIG. 2b comprises a communications module 210a configured to perform below steps S102, S102a, S102b, S110, S110a, S110b. The core network gateway node 121, 122 of FIG. 2b may further comprises a number of optional functional modules, such as any of a remove module 210b configured to perform below steps S108a, S108aa, an add module 210c configured to perform below steps S108b, S108bb, an indicate module 210d configured to perform below step S112, an acquire module 210e configured to perform below step S104, and an acknowledge module 210f configured to perform below step S106. The functionality of each functional module 210a-210f will be further disclosed below in the context of which the functional modules 210a-210f may be used. In general terms, each functional module 210a-210f may be implemented in hardware or in software. Preferably, one or more or all functional modules 210a-210f may be implemented by the processing circuitry 210, possibly in cooperation with functional units 220 and/or 230. The processing circuitry 210 may thus be arranged to from the storage medium 230 fetch instructions as provided by a functional module 210a-210f and to execute these instructions, thereby performing any steps as will be disclosed hereinafter.

The core network gateway node 121, 122 may be provided as a standalone device or as a part of at least one further device. For example, the core network gateway node 121, 122 may be provided in a node of the core network 120. For example, functionality of the core network gateway node may be implemented in a P-GW 121 or in a C-SGN 122.

Further, functionality of the core network gateway node 121, 122 may be distributed between at least two devices, or nodes. Thus, a first portion of the instructions performed by the core network gateway node 121, 122 may be executed in a first device, and a second portion of the of the instructions performed by the core network gateway node 121, 122 may be executed in a second device; the herein disclosed embodiments are not limited to any particular number of devices on which the instructions performed by the core network gateway node 121, 122 may be executed. Hence, the methods according to the herein disclosed embodiments are suitable to be performed by a core network gateway node 121, 122 residing in a cloud computational environment. Therefore, although a single processing circuitry 210 is illustrated in FIG. 2a the processing circuitry 210 may be distributed among a plurality of devices, or nodes. The same applies to the functional modules 210a-210f of FIG. 2b and the computer program 420a of FIG. 4 (see below).

Figure 3A:
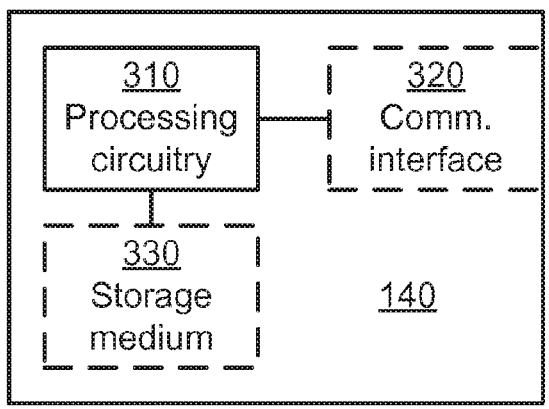
FIG. 3a is a schematic diagram showing functional units of a wireless device according to an embodiment.

FIG. 3a schematically illustrates, in terms of a number of functional units, the components of a wireless device 140 according to an embodiment. Processing circuitry 310 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 410b (as in FIG. 4), e.g. in the form of a storage medium 330.

Particularly, the processing circuitry 310 is configured to cause the wireless device 140 to perform a set of operations, or steps, S202-S206. These operations, or steps, S202-S206 will be disclosed below. For example, the storage medium 330 may store the set of operations, and the processing circuitry 310 may be configured to retrieve the set of operations from the storage medium 330 to cause the wireless device 140 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The wireless device 140 may further comprise a communications interface 320 for communications with entities of the RAN 130, such as one or more RANNs 131, and indirectly with entities of the core network 120, such as a core network gateway node 121, 122. As such the communications interface 320 may comprise one or more transmitters and receivers, comprising analogue and digital components and a suitable number of antennas for wireless communications and ports for wireline communications.

The processing circuitry 310 controls the general operation of the wireless device 140 e.g. by sending data and control signals to the communications interface 320 and the storage medium 330, by receiving data and reports from the communications interface 320, and by retrieving data and instructions from the storage medium 330. Other components, as well as the related functionality, of the wireless device 140 are omitted in order not to obscure the concepts presented herein.

Figure 3B:
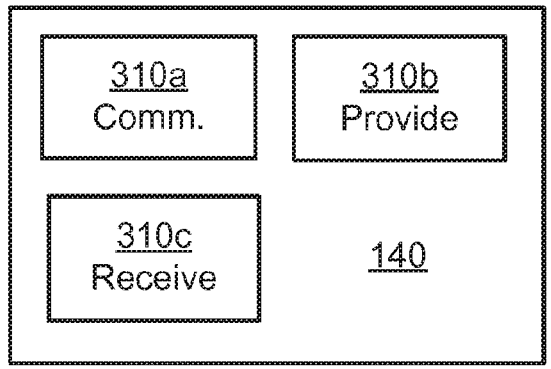
FIG. 3b is a schematic diagram showing functional modules of a wireless device according to an embodiment.

FIG. 3b schematically illustrates, in terms of a number of functional modules, the components of a wireless device 140 according to an embodiment. The wireless device 140 of FIG. 3b comprises a number of functional modules; a communications module 310a configured to perform below step S206, a provide module 310b configured to perform below step S202, and a receive module 310c configured to perform below step S204. The wireless device 140 of FIG. 3b may further comprises a number of optional functional modules. The functionality of each functional module 310a-310c will be further disclosed below in the context of which the functional modules 310a-310c may be used. In general terms, each functional module 310a-310c may be implemented in hardware or in software. Preferably, one or more or all functional modules 310a-310c may be implemented by the processing circuitry 310, possibly in cooperation with functional units 320 and/or 330. The processing circuitry 310 may thus be arranged to from the storage medium 330 fetch instructions as provided by a functional module 310a-310c and to execute these instructions, thereby performing any steps as will be disclosed hereinafter.

Figure 4:
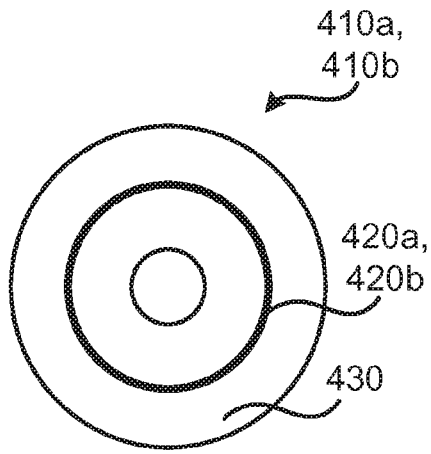
FIG. 4 shows one example of a computer program product comprising computer readable means according to an embodiment.

FIG. 4 shows one example of a computer program product 410a, 410b comprising computer readable means 430. On this computer readable means 430, a computer program 420a can be stored, which computer program 420a can cause the processing circuitry 210 and thereto operatively coupled entities and devices, such as the communications interface 220 and the storage medium 230, to execute methods according to embodiments described herein. The computer program 420a and/or computer program product 410a may thus provide means for performing any steps of the core network gateway node 121, 122 as herein disclosed. On this computer readable means 430, a computer program 420b can be stored, which computer program 420b can cause the processing circuitry 310 and thereto operatively coupled entities and devices, such as the communications interface 320 and the storage medium 330, to execute methods according to embodiments described herein. The computer program 420b and/or computer program product 410b may thus provide means for performing any steps of the wireless device 140 as herein disclosed.

In the example of FIG. 4, the computer program product 410a, 410b is illustrated as an optical disc, such as a CD (compact disc) or a DVD (digital versatile disc) or a Blu-Ray disc. The computer program product 410a, 410b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 420a, 420b is here schematically shown as a track on the depicted optical disk, the computer program 420a, 420b can be stored in any way which is suitable for the computer program product 410a, 410b.

Figure 7:
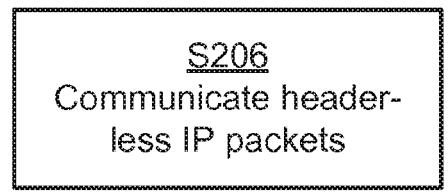
FIGS. 5, 6, 7, and 8 are flowcharts of methods according to embodiments.
Figure 5:
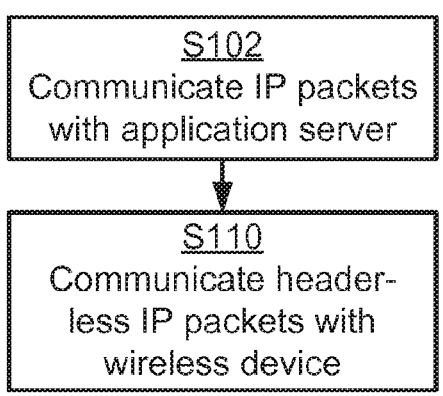
Figure 8:
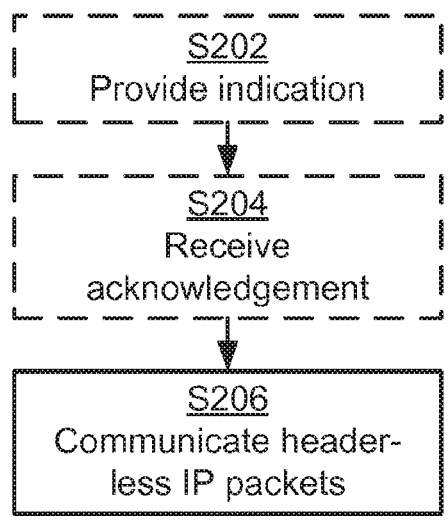
Figure 6A:
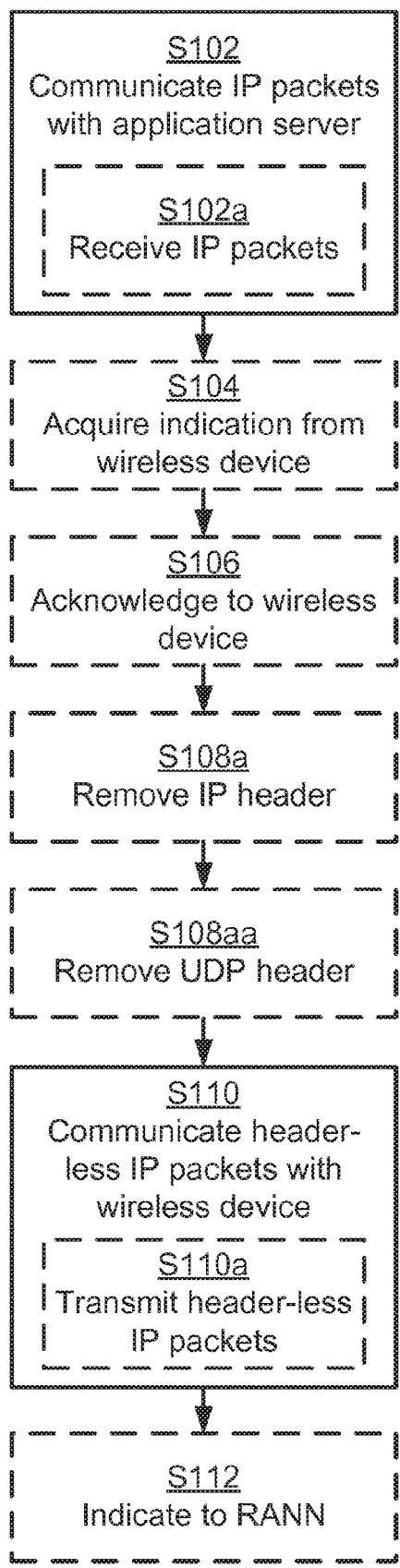
Figure 6B:
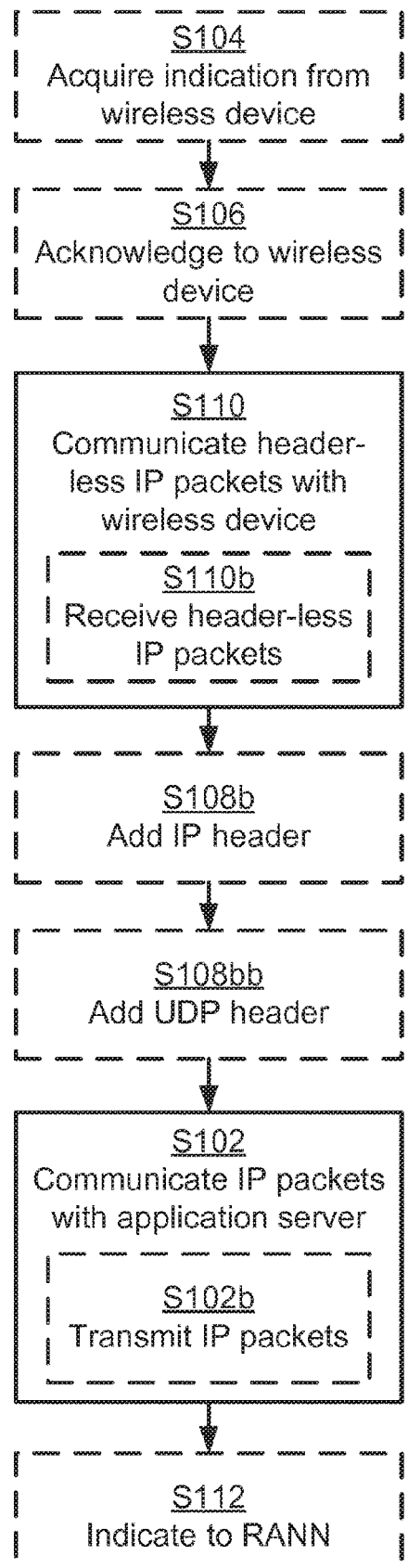

FIGS. 5 and 6 are flow charts illustrating embodiments of methods for communicating non-IP data over a packet data network 100 of PDN type IPv4, IPv6, or IPv4IPv6 as performed by the core network gateway node 121, 122. FIGS. 7 and 8 are flow charts illustrating embodiments of methods for communicating non-IP data over a packet data network 100 of PDN type IPv4, IPv6, or IPv4IPv6 as performed by the wireless device 140. The methods are advantageously provided as computer programs 420a, 420b.

Reference is now made to FIG. 5 illustrating a method for communicating non-IP data over a packet data network 100 of PDN type IPv4, IPv6, or IPv4IPv6 as performed by the core network gateway node 121, 122 according to an embodiment.

The core network gateway node 121, 122 communicates IP packets with the application server 111. The core network gateway node 121, 122 is thus configured to, in a step S102, communicate IP packets over a packet data network 100 of PDN type IPv4, IPv6, or IPv4IPv6 with an application server in. The IP packets comprise an IP header 1110 and are addressed to a wireless device 140.

However, for communications between the core network gateway node 121, 122 and the wireless device 140 the communications may be regarded as header-less. Particularly, the core network gateway node 121, 122 is configured to, in a step S110, communicate header-less payload packets over the packet data network 100 with the wireless device 140.

The header-less payload packets communicated in step S110 represent the non-IP data. Further, the header-less payload packets communicated in step S110 correspond to the IP packets communicated in step S102 but with the IP header 1110 being removed.

Figure 11:
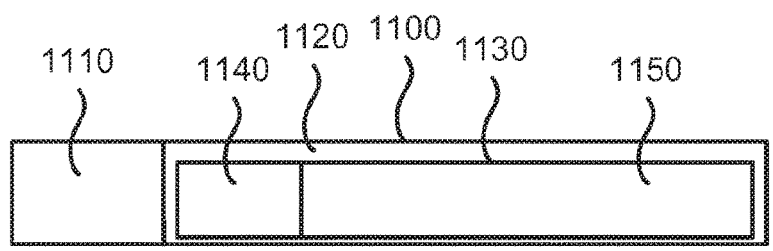
FIG. 11 is a schematic illustration of an IP packet according to embodiments.

FIG. 11 schematically illustrates the structure of an IP packet 1100 according to an embodiment. The IP packet 1100 comprises a header 1110 and a payload 1120. The payload 1120 in turn comprises a UDP packet 1130. The UDP packet 1130 comprises a UDP header 1140 and a payload 1150. Hence payloads 1120 and 1150 represent header-less payload packets. As the skilled person understands, instead of comprising a UDP packet 1130 the IP packet 1100 may comprise another type of packet. The herein disclosed UDP packet 1130 may thus be replaced by any other suitable packets having a header which can be removed according to embodiments disclosed herein.

There may be different ways for the core network gateway node 121, 122 to communicate the IP packets 1100 with the application server 111. For example, the IP packets 1100 may be communicated on the SGi interface (if the core network gateway node is a P-GW 121) or on the S5/S8 interface (if the core network gateway node is a C-SGN 122) of the core network gateway node. Hence, the communications interface 320 may implement an SGi interface and/or a S5/S8 interface.

There may be different ways for the core network gateway node 121, 122 to communicate the header-less payload packets 1120, 1150 with the wireless device 140. For example, the header-less payload packets 1120, 1150 may be communicated on a connection over the packet data network 100 where this connection is identifiable as non-IP.

As noted above, the P-GW 121 may not provide the allocated IP address to the wireless device 140 i.e. the Stateless Address Autoconfiguration or DHCP may not be used for non-IP PDN connections. Further, in case the IP packets 1100 comprise an IP address of the wireless device 140 the header-less payload packets 1120, 1150 may not comprise any IP address of the wireless device 140.

The header-less payload packets 1120, 1150 may be communicated in General Packet Radio Service Tunnelling Protocol (GTP) frames.

Reference is now made to FIG. 6 illustrating methods for communicating non-IP data over a packet data network 100 of PDN type IPv4, IPv6, or IPv4IPv6 as performed by the core network gateway node 121, 122 according to further embodiments.

The core network gateway node 121, 122 may be configured to remove IP headers 1110 in packets being communicated to the wireless device 140 (i.e., in the downlink), and to add IP headers 1110 being communicated from the wireless device 140 (i.e., in the uplink).

Hence, according to an embodiment the core network gateway node 121, 122 is configured to, in a step S102a, communicate the IP packets 1100 with the application server 111 by receiving the IP packets 1100 over the packet data network 100. The core network gateway node 121, 122 may then be configured to, in a step S108a, remove the IP header 1110 from the IP packets 1100 to form the header-less payload packets 1120, 1150. According to this embodiment the core network gateway node 121, 122 is configured to, in a step S110a, communicate the header-less payload packets 1120, 1150 with the wireless device 140 by transmitting the header-less payload packets 1120, 1150 over the packet data network 100 towards the wireless device 140.

Further, each IP packet may comprise a UDP header 1140. The core network gateway node 121, 122 may then be configured to, in a step S108aa, remove the UDP header 1140 from the IP packets 1100 prior to transmitting the header-less payload packets 1120, 1150 in step S110a. A similar procedure as in step S108aa may be used for other types of headers than UDP headers.

According to another embodiment the core network gateway node 121, 122 is configured to, in a step S110b, communicate header-less payload packets 1102, 1150 with the wireless device 140 by receiving header-less payload packets 1120, 1150 over the packet data network 100 from the wireless device 140. The core network gateway node 121, 122 may then be configured to, in a step S108b, add the IP header 1110 to the header-less payload packets 1120, 1150 to form the IP packets 1100. According to this embodiment the core network gateway node 121, 122 is configured to, in a step S102b, communicate the IP packets 1100 with the application server 111 by transmitting the IP packets 1100 over the packet data network 100 towards the application server 111.

Further, the core network gateway node 121, 122 may be configured to, in a step S108bb, add a UDP header 1140 to the IP packets 1100 prior to transmitting the IP packets 1100 in step S102b. A similar procedure as in step S108bb may be used for other types of headers than UDP headers.

There are several ways for the core network gateway node 121, 122 to determine whether to remove/add an IP header 1110 (and UDP header 1140) to packets transmitted to/from the wireless device 140. For example, the application server 111 identifies IP address, protocol (typically UDP) and port (any value can be used) that are configured in relation to the wireless device 140 in the core network gateway node 121, 122 as well as the local identities to use in relation to the wireless device 140. IPv6 address suffix-prefix may be learnt from IP address allocation for the wireless device 140, protocol and port.

The core network gateway node 121, 122 may be configured to, in a step S104, acquire an indication of the wireless device 140 to communicate header-less with the wireless device 140. There are different events that can trigger the core network gateway node 121, 122 may to communicate header-less with the wireless device 140.

For example, the wireless device 140 may request for header removal/header addition to be activated in the core network gateway node 121, 122. That is, the indication acquired in step S104 may request the core network gateway node 121, 122 to remove the IP header 1110 from IP packets 1100 to be transmitted towards the wireless device 140, and/or to add the IP header 1110 to the header-less packets 1120, 1150 received from the wireless device 140 to be transmitted towards the AS 111. The indication may be acquired during an initial attach procedure or a PDN Activation procedure of the wireless device 140.

Whether the core network gateway node 121, 122 is to communicate header-less with the wireless device 140 may thus be negotiated between the core network gateway node 121, 122 and the wireless device 140. In existing communications network Protocol Configuration Options (PCO) or Additional Protocol Configuration Options (APCO) information elements are used for negotiations between the core network gateway node 121, 122 and the wireless device 140.

According to the embodiments disclosed herein the field "PDN Type" for e.g. "IPv6" is used and support is added for a "Non-IP" request (i.e., a request for header-less communications) being sent from the wireless device 140 to the core network gateway node 121, 122 in the existing PCO or APCO information elements. Hence, the indication acquired in step S104 may be provided in PCO information elements or APCO information elements received from the wireless device 140. The core network gateway node 121, 122 may not perform any router advertisements for IPv6 when the new PCO value has been negotiated.

An alternative to use PCO/APCO may for the core network gateway node 121, 122 be to use the International Mobile Station Equipment Identity (IMEI) or Type Allocation Code (TAC) of the wireless device 140 to implicitly know what wireless devices 140 that may communicate header-less communications. The Non-IP option may then be statically defined per device-type. This implies that no negotiation between the core network gateway node 121, 122 and the wireless device 140 is needed; instead the core network gateway node 121, 122 may have access to rules, for examples as stored in the storage medium 230, that identifies the wireless devices that will use header-less communications and may read the IMEI/TAC in order to determine whether to communicate header-less with the wireless device 140 or not.

The core network gateway node 121, 122 may further provide an indication to the wireless device 140 that a "Non-IP" PDN connection has been setup. Hence, the core network gateway node 121, 122 may be configured to, in a step S106, acknowledge to the wireless device 140 to communicate header-less with the wireless device 140. The acknowledging may be provided in a Create Session Response or a PDN Activation Response.

The header-less packets 1120, 1150 may be communicated on UDP ports of the core network gateway node 121, 122. That is, the core network gateway node 121, 122 may have a pre-configured channel (e.g. UDP/IP with dedicated UDP-ports) for any "Non-IP" communication that allows the core network gateway node 121, 122 to capture uplink header-less packets 1120, 1150 and encapsulate them in IP-frames (e.g. UDP/IP) and send that to an configured application server 111. In the downlink, the core network gateway node 121, 122 captures the IP packets (e.g. UDP/IP) based on target IP address and port), removes the headers and encapsulates the payload in raw format in frames, such as GTP frames, that are forwarded to the wireless device 140.

As will be further disclosed below, the core network gateway node 121, 122 may indicate to a RANN 131 not to use header compression for the wireless device 140 (for example if DRBs are used). Hence, the core network gateway node 121, 122 may be configured to, in a step S112, indicate to a RANN 131 serving the wireless device 140 to not use header compression for the wireless device 140.

Reference is now made to FIG. 7 illustrating a method for communicating non-IP data over a packet data network 100 of PDN type IPv4, IPv6, or IPv4IPv6 as performed by the wireless device 140 according to an embodiment.

As noted above, the core network gateway node 121, 122 in step S110 communicate header-less payload packets 1120, 1150 with the wireless device 140. The wireless device 140 is therefore configured to, in a step S206, communicate header-less payload packets 1120, 1150 on a connection over a packet data network 100 of PDN type IPv4, IPv6, or IPv4IPv6 with the core network gateway node 121, 122. The connection is by the wireless device 140 regarded as a point-to-point connection.

This may require the wireless device 140 only to communicates with one remote application server in and that the IP configuration for that application server in may be set up from the core network gateway node 121, 122 instead of from the application server in so that the air interface Uu only carries the actual payload. This type of compression-like communications then need to terminate in the core network gateway node 121, 122 instead of in the RANN 131 as in current header compression schemes.

The wireless device is configured with an Access Point Name (APN) and the APN may be identifiable as non-IP.

As noted above, the header-less payload packets 1120, 1150 may not comprise any User UDP header 1140.

As noted above, the header-less payload packets 1120, 1150 may not comprise any IP address of the wireless device.

As noted above, the connection between the wireless device 140 and the core network gateway node 121, 122 may be identifiable as non-IP.

As noted above, the header-less payload packets 1120, 1150 may be communicated in GTP frames.

Reference is now made to FIG. 8 illustrating methods for communicating non-IP data over a packet data network 100 of PDN type IPv4, IPv6, or IPv4IPv6 as performed by the wireless device 140 according to further embodiments.

As noted above, the wireless device 140 and the core network gateway node 121, 122 may negotiate whether or not to use header-less communications there between. Hence, the wireless device 140 may be configured to, in a step S202, provide an indication to the core network gateway node 121, 122 to communicate header-less with the wireless device 140. As noted above, the indication may be provided during an initial attach procedure or PDN Activation procedure of the wireless device 140.

As noted above, the core network gateway node 121, 122 may indicate to the wireless device 140 that a "non-IP" PDN connection has been setup. Hence, the wireless device 140 may be configured to, in a step S204, receive an acknowledgement from the core network gateway node 121, 122 that the core network gateway node 121, 122 is to communicate header-less with the wireless device 140. As noted above, the acknowledgement may be received in a Create Session Response or a PDN Activation Response.

The wireless device 140 may be configured not to use IPv6. However, the herein disclosed header-less communications may be performed in parallel to communications of ordinary IP frames between the wireless device 140 and the core network gateway node 121, 122. The herein disclosed embodiments may thus enable parallel transmission of header-less payload packets 1120, 1150 and ordinary IP frames (IPv4 and/or IPv6 frames). When parallel communication with header-less payload packets and regular IP packets is performed, an encapsulation format may be used to distinguish the header-less payload packets from the regular IP packets in the uplink direction. One mechanism to achieve such a distinction is to prepend non-IP data by one byte that may not occur in IP headers, e.g. the value zero ("0"). But other alternatives for achieving such a distinction of the frames may be used as well. For example, all IP frames on a "Non-IP" capable connection may be prepended by a byte with value 255 ("0xff"). Any header-less payload packets on that connection that starts with the value 255 (on the first byte) is prepended with one byte of value 255 as well. In this way, when the value 255 is present in the first two bytes, or if any other value than 255 is present in the first byte, the packet is interpreted as a header-less payload packet, whilst all other packets are interpreted as IP packets and the first byte is removed. This would provide low overhead for the header-less payload packets.

The header-less communications may be used for narrow-band optimized communication for main functions of the wireless device 140 and ordinary IP communications may be used, for example, for data-intensive communications such as software upgrades. The header-less communications and the ordinary IP communications may be multiplexed to different parts of the processing circuitry 310 of the wireless device 140. The part of the processing circuitry 310 handling communications of ordinary IP traffic may then for instance be sleeping/turned off when it is not needed, thereby saving processing and/or power requirements in the wireless device 140.

One particular embodiment for communicating non-IP data over a packet data network 100 of PDN type IPv4, IPv6, or IPv4IPv6 based on at least some of the above disclosed embodiments will now be disclosed in detail.

This embodiment relates to setting up a "non-IP" PDN connection (or a packet data protocol (PDP) context) to allow such protocol to be used by a CIoT wireless device 140 towards the application server 111 in the packet data network 100. The core network gateway node 121, 122 in this case can be a transparent gateway, and the CIoT wireless device 140 can communicate to the specific application server 111 directly using the herein disclosed methods. No IP specific procedure is required by the core network gateway node 121, 122.

Figure 10:
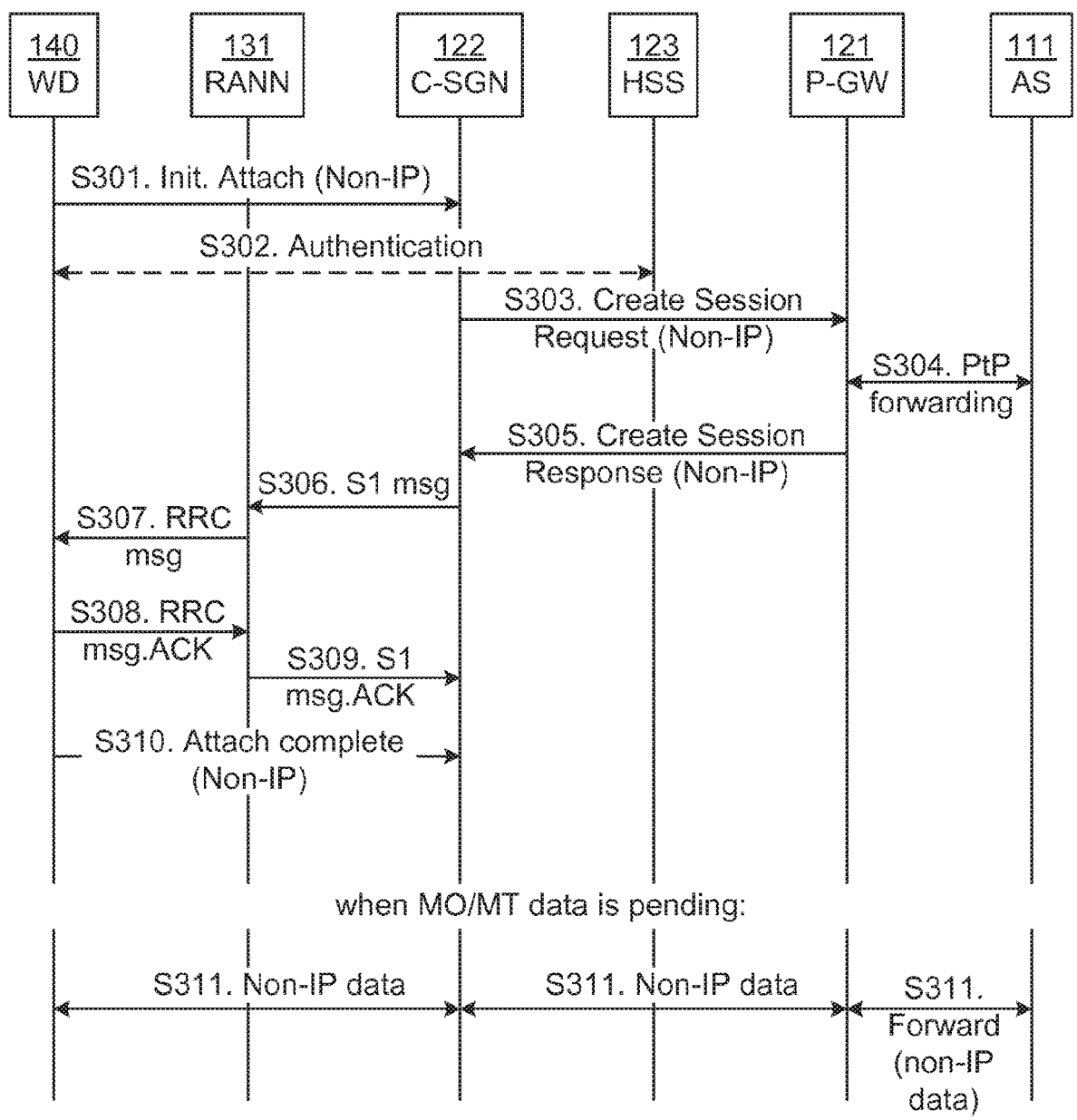
FIG. 10 is a signalling diagram according to embodiments.

Reference is now made to the signalling diagram according to FIG. 10. As noted above (see, e.g., FIG. 1) the P-GW 121 and the C-SGN 122 are logical entities that may be implemented in the same entity; the P-GW 121 could be part of the C-SGN 122. However, for clarity these entities have been separately illustrated in FIG. 10.

S301: The wireless device 140 sends an initial attach with an indication set to "Non-IP". The message format is as that defined in TS 24.301. One way to implement step S301 is to perform any of steps S104, S202.

S302: The C-SGN 122, if deemed necessary, authenticates the wireless device 140 according to known procedures. The C-SGN 122 processes the initial attach and identifies that the wireless device 140 uses non-IP data. IP address allocation will be carried out, but no IP headers will be used on the data delivered to/from the wireless device 140. Since a non-IP wireless device 140 has no means to address different Application Servers 111, the C-SGN 122 selects a proper destination for the wireless device 140, e.g. the Application Server 111, according to the APN and will forward any data from the wireless device 140 to that specific Application Server 111. The non-IP data sent to/from the Application Server 111 and the wireless device 140 is encapsulated in UDP/IP packets. The IP address allocated to the wireless device 140 and the IP address of the AS in configured in the non-IP APN will be used for setting the addresses in the UDP/IP header. Other IP related operations are the same as in step S304. One way to implement step S302 is to perform steps S106.

The steps S303 to S305 are executed only when wireless device 140 is roaming.

S303. The C-SGN 122 processes the initial attach and identifies, based on the Non-IP indication received in step S301, that the wireless device 140 uses non-IP data. Therefore, the C-SGN 122 selects a proper P-GW 121 according to the APN. The C-SGN 122 sends a Create Session Request or a similar request message to the P-GW 121, indicating that "Non-IP" is requested. One way to implement step S303 is to perform step S104.

S304. The P-GW 121 runs the IP related operations for "non-IP", e.g. IP address allocation, but no SLAAC (e.g. no Router Advertisements sent to the wireless device 140), modified switching where IP headers are removed/added at forwarding (IP headers removed DL and added UL). The P-GW 121 uses a direct forwarding path, e.g. a point-to-point tunnel, towards the Application Server 111 or the packet data network no associated with the APN.

In this respect, the "non-IP" service provided by the cellular network 150 (as represented by the RAN 130 and the CN 12) for CIoT communications can be regarded as a header compression or header removal between the wireless device 140 and the P-GW 121 to reduce the amount of overhead data passed over the low bitrate radio interface Uu. The interface SGi towards the Application Server 111 is still a "normal" IP interface, enabling the use of any available IP technology at the Application Server side and to minimize the impact on the cellular network 150. Since a CIoT wireless device 140 using "non-IP" has no means to address different Application Servers 111, the connection between the wireless device 140 and the Application Server 111 will be regarded as a point-to-point tunnel. The IP address of the Application Server 111 is defined in the APN.

S305. The P-GW 121 responds with a Create Session Response, indicating that the "Non-IP" PDN connection has been setup. One way to implement step S305 is to perform any of steps S106, S204.

S306. The C-SGN 122 uses already available S1 messages to establish the corresponding wireless device context on the RANN 131. The C-SGN 122 indicates to the RANN 131 that header compression shall not be used. The C-SGN 122 also includes an Attach Accept message at Non-access stratum (NAS) layer. One way to implement step S306 is to perform step S112.

S307-S308. Radio resource control (RRC) messages to setup the corresponding radio bearers, including the DRB for the PDN connection, are exchanged. The same type of DRB is used regardless if it conveys IP or non-IP data.

If small data delivery mechanisms are used, e.g. so-called data over NAS, the DRB establishment is not necessary, e.g. communication over a default bearer may be sufficient.

S309. Already available S1 messages are used to inform the C-SGN 122 of the successful setup of the radio bearers.

S310. The wireless device 140 sends an Attach Complete to the C-SGN 122 to indicate the successful setup of the "Non-IP" PDN connection.

S311. For uplink non-IP traffic, the wireless device 140 sends the non-IP data to the C-SGN 122 over the PDN connection. The C-SGN 122 in turn encapsulates and forwards the data in UDP/IP packets to the Application Server 111. In case the wireless device 140 is roaming, the C-SGN 122 forwards the non-IP data to P-GW 121 and the P-GW 121 forwards the data encapsulated in UDP/IP packets to the Application Server 111. For downlink non-IP traffic, the Application Server 111 sends non-IP data encapsulated in UDP/IP packets for the wireless device 140 and forwards the data to the P-GW 121 or C-SGN 122. The P-GW 121 at roaming and C-SGN 122 otherwise removes the UDP/IP header before it forwards the downlink non-IP traffic to the wireless device 140 using the bearer for the non-IP PDN connection. The P-GW 121/C-GSN may use a known UDP port for triggering the IP header removal. Alternatively the triggering may be coupled with the used APN. One way to implement step S310 is to perform any of steps S102, S102*a*, S102*b*, S108*a*, S108*aa*, S108*b*, S108*bb*, S110, S110*a*, S110*b*, S206.

As already mentioned at the beginning of the detailed description, the wireless device 140 is in the AS 111 identified by the IP address of the wireless device 140. When DL data is received on the SGi interface in the P-GW 121 and/or C-SGN 122 the data is switched to the correct PDN connection for forwarding to the wireless device 140 by mapping the destination IP address to the PDN Connection Tunnel endpoint identifier (TEID). The destination IP address defines the ID of the wireless device 140 in the received DL data. The IP address allocation enables the ID to be present in the P-GW 121 and/or C-SGN 122 as part of a switching table. Further the IP address can be provided (from the P-GW 121 and/or the C-SGN 122) to the AS 111 in the same way for both "non-IP" and "IP" based data (e.g. over the top or using TS 29.061 Radius/Diameter mechanisms, etc.).

As also already mentioned at the beginning of the detailed description, some identity (ID) of the wireless device 140 needs to be present in the received DL data. Also, the ID needs to be stored the ID in the CN 120 and/or RAN 130. For example, the ID may be present in the P-GW 121 and/or C-SGN 122 as part of a switching table. The ID could, for example, be propagated from subscription information of the wireless device 140, e.g. stored in the HSS 123 or similar database.

It is possible to use other small data delivery mechanisms to deliver non-IP traffic between the wireless device 140 and the C-SGN 122, e.g. so-called Data over NAS.

For PDN connections marked as "Non-IP", the P-GW 121 does not use SLAAC or DHCP.

UDP/IP headers are thus removed/added before forwarding to/from the wireless device 140. That is, the P-GW 121 or C-SGN 122 adds a UDP/IP header when sending data towards the AS 111 on the SGi interface (or a corresponding interface), and the P-GW 121/C-SGN 122 removes the UDP/IP header when received on the SGi interface before forwarding the data towards the wireless device 140.

The RANN 131 (and/or MME) is provided with an indication not to use header compression for the wireless device 140 (if DRBs are used).

The inventive concept has mainly been described above with reference to a few embodiments. However, as is readily appreciated by a person skilled in the art, other embodiments than the ones disclosed above are equally possible within the scope of the inventive concept, as defined by the appended patent claims. For example, although some embodiments have been disclosed in the context of 3GPP release 13 standardization of Cellular Internet-of-Things (Machine-to-Machine) type communication, the herein disclosed embodiments are suitable for any type of communication over narrowband links using a PDN 100 of PDN type IPv4, IPv6, or IPv4IPv6.

The invention claimed is:

1. A method for communicating non-Internet Protocol data over a packet data network (PDN) of PDN type IPv4, IPV6, or IPv4IPv6, the method being performed by a core network gateway node, the method comprising:

acquiring an indication of a wireless device to communicate header-less with the wireless device, wherein the indication is provided in Protocol Configuration Options (PCO) information elements or Additional Protocol Configuration Options (APCO) information elements received from the wireless device;

determining based on the indication whether to remove an Internet protocol (IP) header;

in response to removing the IP header, reserving an, IP address for the wireless device without providing the IP address to the wireless device, wherein the wireless device is not able to implement an IP stack and a user datagram protocol (UDP) stack to communicate using the IP address;

communicating IP packets over the packet data network of PDN type IPV4, IPv6, or IPv4IPv6 with an application server, said IP packets comprising an IP header that comprises the IP address of the wireless device and a UDP header; and communicating header-less payload packets without IP headers over a PDN connection with said wireless device by mapping the IP address to a Tunnel endpoint identifier (TEID), and removing the IP header and the UDP header from all IP packets communicated to the wireless device from the core network gateway node before forwarding the header-less payload packets to the wireless device without providing the IP address to the wireless device, wherein said header-less payload packets that are communicated without IP headers represent said non-IP data.

2. The method according to claim 1,
wherein communicating said IP packets with said application server comprises receiving said IP packets over said PDN, the method further comprising:
removing said IP header from said IP packets to form said header-less payload packets; and
wherein communicating said header-less payload packets with said wireless device comprises transmitting said header-less payload packets over said PDN towards said wireless device.

3. The method according to claim 2, further comprising:
removing said UDP header from said IP packets prior to transmitting said header-less payload packets.

4. The method according to claim 1,
wherein communicating said header-less payload packets with said wireless device comprises receiving said header-less payload packets over said PDN from said wireless device;
the method further comprising:
adding said IP header to said header-less payload packets to form said IP packets; and
wherein communicating said IP packets with said application server comprises transmitting said IP packets over said PDN towards said application server.

5. The method according to claim 4, further comprising:
adding a UDP header to said IP packets prior to transmitting said IP packets.

6. The method according to claim 1, wherein said IP packets comprise an IP address of the wireless device and wherein the header-less payload packets do not comprise any IP address of the wireless device.

7. The method according to claim 1, further comprising:
indicating to a radio access network node serving the wireless device to not use header compression for the wireless device.

8. The method according to claim 1, wherein said header-less payload packets are communicated on dedicated UDP ports of the core network gateway node.

9. The method according to claim 1, wherein said header-less payload packets are communicated on a connection over said PDN, and wherein said connection is identifiable as non-IP.

10. The method according to claim 1, wherein the wireless device is configured with an Access Point Name (APN) and wherein said APN is identifiable as non-IP.

11. The method according to claim 1, wherein said indication requests the core network gateway node to remove said IP header from the IP packets to be transmitted towards the wireless device, and/or to add said IP header to said header-less payload packets received from the wireless device.

12. The method according to claim 1, wherein said indication is provided by an International Mobile Station Equipment Identity (IMEI) or a Type Allocation Code (TAC) of the wireless device.

13. The method according to claim 1, wherein said indication is acquired during an initial attach procedure or a PDN Activation procedure of the wireless device.

14. The method according to claim 1, further comprising:
acknowledging to the wireless device to communicate header-less with the wireless device.

15. The method according to claim 14, wherein said acknowledging is provided in a Create Session Response or a PDN Activation Response.

16. The method according to claim 1, wherein said IP packets are communicated on SGi interface or S5/S8 interface of the core network gateway node.

17. The method according to claim 1, wherein said header-less payload packets are communicated in General Packet Radio Service Tunneling Protocol (GTP) frames.

18. A core network gateway node for communicating non-Internet Protocol data over a packet data network (PDN) of PDN type IPv4, IPv6, or IPv4IPv6, the core network gateway node comprising processing circuitry, the processing circuitry being configured to cause the core network gateway node to perform a set of operations causing the core network gateway node to:

acquire an indication of a wireless device to communicate header-less with the wireless device, wherein the indication is provided in Protocol Configuration Options (PCO) information elements or Additional Protocol Configuration Options (APCO) information elements received from the wireless device;

determine based on the indication whether to remove an Internet protocol (IP) header;

in response to removing the IP header, reserve, IP address for the wireless device without providing the IP address to the wireless device, communicate IP packets over the packet data network of PDN type IPv4, IPv6, or IPv4IPv6 with an application server, said IP packets comprising an IP header that comprises the IP address of the wireless device and a User Datagram Protocol (UDP) header; and communicate header-less payload packets without IP headers over a PDN connection with said wireless device by mapping the IP address to a Tunnel endpoint identifier (TEID), and removing the IP header and the UDP header from all IP packets communicated to the wireless device from the core network gateway node before forwarding the header-less payload packets to the wireless device without providing the IP address to wireless device, wherein the wireless device is not able to implement an IP stack and a UDP, stack to communicate using the IP address, wherein said header-less payload packets that are communicated without IP headers represent said non-IP data.

19. The core network gateway node according to claim 18, wherein the core network gateway node is a Packet Data Network Gateway (P-GW) or a Cellular Internet of Things Serving Gateway Node (C-SGN).

20. A computer program for communicating non-Internet Protocol data over a packet data network (PDN) of PDN type IPv4, IPv6, or IPv4IPv6, the computer program comprising a non-transitory computer readable medium having computer readable program code embodied in the non-transitory computer readable medium, the computer readable program code which, when run on processing circuitry of a core network gateway node, causes the core network gateway node to:

acquire an indication of a wireless device to communicate header-less with the wireless device, wherein the indication is provided in Protocol Configuration Options (PCO) information elements or Additional Protocol Configuration Options (APCO) information elements received from the wireless device;

determine based on the indication whether to remove an Internet protocol (IP) header;

in response to removing the IP header, reserve an IP address for the wireless device without providing the IP address to the wireless device, wherein the wireless device is not able to implement an IP stack and a user datagram protocol (UDP) stack to communicate using the IP address;

communicate IP packets over the packet data network of PDN type IPv4, IPv6, or IPv4IPv6 with an application server, said IP packets comprising an IP header that comprises the IP address of the wireless device and a UDP header; and communicate header-less payload packets without IP headers over a PDN connection with said wireless device by mapping the IP address to a Tunnel endpoint identifier (TEID), and removing the IP header and the UDP header from all IP packets communicated to the wireless device from the core network gateway node before forwarding the header-less payload packets to the wireless device without providing the IP address to the wireless device, wherein said header-less payload packets that are communicated without IP headers represent said non-IP data.

* * * * *

UNITED STATES PATENT AND TRADEMARK OFFICE
CERTIFICATE OF CORRECTION

| | | |
|---|---|---|
| PATENT NO. | : 12,143,464 B2 | Page 1 of 1 |
| APPLICATION NO. | : 15/748360 | |
| DATED | : November 12, 2024 | |
| INVENTOR(S) | : Backman et al. | |

It is certified that error appears in the above-identified patent and that said Letters Patent is hereby corrected as shown below:

In the Specification

In Column 1, Line 29, delete "program's" and insert -- project --, therefor.

In Column 5, Line 4, delete "Server in" and insert -- Server 111 in --, therefor.

In Column 9, Line 66, delete "server in." and insert -- server 111. --, therefor.

In Column 13, Line 5, delete "server in" and insert -- server 111 --, therefor.

In Column 13, Line 6, delete "server in" and insert -- server 111 --, therefor.

In Column 13, Line 8, delete "server in" and insert -- server 111 --, therefor.

In Column 14, Line 57, delete "AS in" and insert -- AS 111 --, therefor.

In Column 15, Line 11, delete "network no" and insert -- network 110 --, therefor.

Signed and Sealed this
Twenty-ninth Day of April, 2025

Coke Morgan Stewart
*Acting Director of the United States Patent and Trademark Office*